United States Patent [19]

Iwamoto et al.

[11] Patent Number: 4,972,024
[45] Date of Patent: Nov. 20, 1990

[54] ANIONICALLY-POLYMERIZED-RUBBER-MODIFIED STYRENE COPOLYMERS

[75] Inventors: Mune Iwamoto, Yokohama; Norifumi Ito, Kamakura; Kazuo Sugazaki, Yokohama; Tetsuyuki Matsubara, Yokohama; Toshihiko Ando, Yokohama; Yasuo Furuta, Hiratsuka, all of Japan

[73] Assignee: Mitsui Toatsu Chemicals, Inc., Tokyo, Japan

[21] Appl. No.: 224,329

[22] Filed: Jul. 26, 1988

[51] Int. Cl.$^5$ ............................................. C08F 279/00
[52] U.S. Cl. ..................................... 525/314; 525/316
[58] Field of Search .............................. 525/316, 314

[56] References Cited

U.S. PATENT DOCUMENTS

| | | | |
|---|---|---|---|
| 4,057,601 | 11/1977 | Moczygemba | 525/314 |
| 4,421,895 | 12/1983 | Echle et al. | 525/316 |
| 4,482,677 | 11/1984 | Teranaka et al. | 525/316 |
| 4,587,294 | 5/1986 | Matsubara et al. | 525/316 |
| 4,598,124 | 7/1986 | Aliberti et al. | 525/316 |
| 4,639,494 | 1/1987 | Imai et al. | 525/316 |
| 4,640,959 | 2/1987 | Alle | 525/316 |

Primary Examiner—John C. Bleutge
Assistant Examiner—Vasu S. Jagannathan
Attorney, Agent, or Firm—Burns, Doane, Swecker & Mathis

[57] ABSTRACT

Disclosed herein is a rubber-modified styrene copolymer which contains as an impact strength modifier a rubbery polymer having a viscosity of 2–250 centipoises as measured at 25° C. as a 5 wt. % styrene solution and a styrene insoluble content lower than 0.1 wt. %; produced by anionic polymerization and dispersed in a continuous phase of a styrene-acrylonitrile copolymer. The rubbery polymer contains small particles of the same styrene-acrylonitrile copolymer occluded in the form of cells. The areas of particles in each of which the maximum cell diameter is smaller than 0.1 μm are at least 40% of the area of all the particles of the rubbery polymer and the volume average particle size of these particles is 0.1–0.4 μm. The weight ratio of the monomers in the styrene-acrylonitrile copolymer is 90/10≧styrene/acrylonitrile≧55/45. Per 100 parts by weight of the copolymer, the proportions of polymers having a molecular weight greater than 1,000,000 is smaller than 0.5 part by weight while the proportion of polymers having a molecular weight greater than 1,200,000 is smaller than 0.01 part by weight.

11 Claims, 1 Drawing Sheet

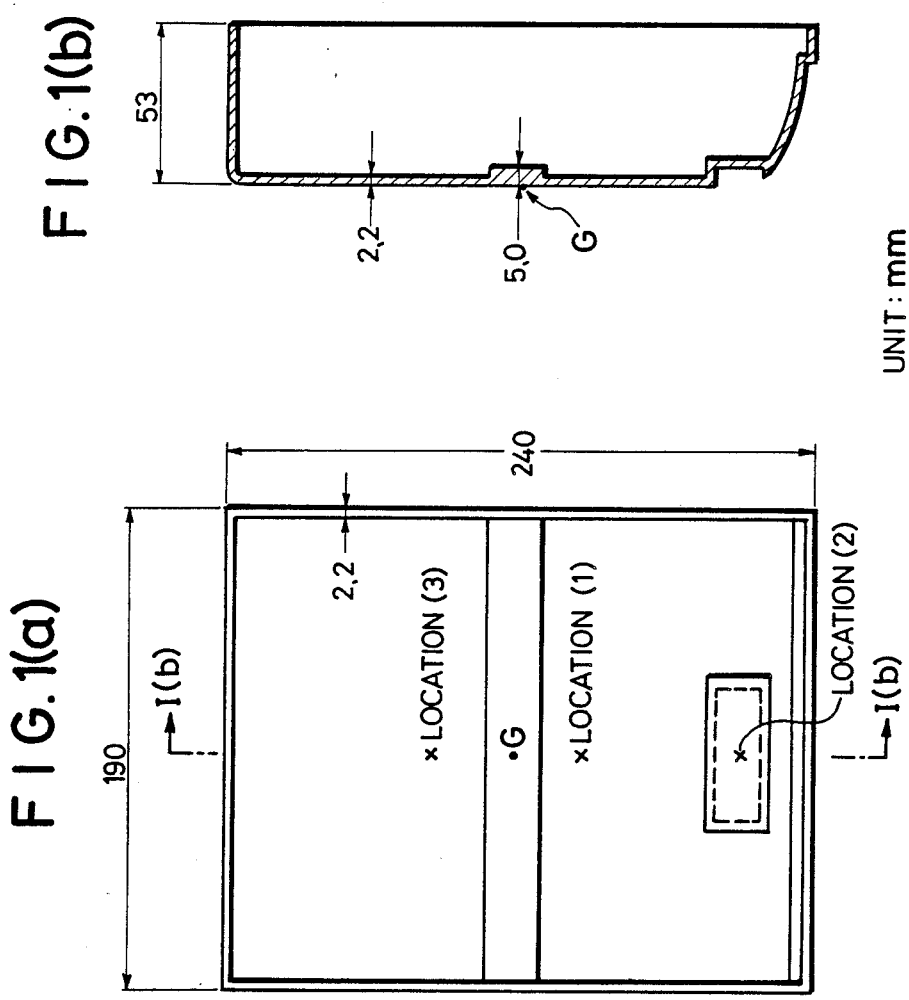

ANIONICALLY-POLYMERIZED-RUBBER-MODIFIED STYRENE COPOLYMERS

BACKGROUND OF THE INVENTION (1) Field of the Invention:

This invention relates to resinous molding materials, and more specifically to rubber-modified styrene copolymers which can provide molded articles of excellent external appearance and strength, have superb processability and are composed of a copolymer containing a rubbery polymer formed by anionic polymerization, styrene and acrylonitrile as essential components. Described still more specifically, this invention is concerned with rubber-modified styrene copolymers (hereinafter abbreviated as "RMCs") which can provide molded articles of excellent gloss, external appearance and impact strength and moreover can show excellent fluidity upon their injection molding.

(2) Description of the Related Art:

RMCs made of a rubbery polymer and a styrene-acrylonitrile (SA) copolymer of a styrene-type monomer and an acrylonitrile-type monomer are widely known as ABS resins in general. Reflecting the expanded application field of such copolymers, they have been being used more and more for the production of molded articles having a complex configuration and a thin thickness. There is hence an outstanding demand for resins having high fluidity upon injection molding and high impact strength. It is also strongly desired to improve the gloss, an external characteristic, of a molded article, especially, the gloss of a gate portion of an injection-molded article and that of its flow end portion in the injection-molded article and further to reduce the difference in gloss therebetween. There is a still further demand for the reduction of marks (jetting and the like) around the gate, which occur at the time of injection molding.

Generally, such RMCs have heretofore been polymerized by emulsion polymerization, using a rubber latex. As a method for improving the impact strength of an RMC, it has been attempted to increase the molecular weight of the SA copolymer or to increase the amount of the rubber component. Such a method is however accompanied by problems that the fluidity of the resin is decreased upon its molding and moreover the external appearance of the resulting molded article is reduced so as to result in a low gloss at the flow end, a greater difference in gloss between the gate portion and the flow end and the occurrence of more marks in the vicinity of the gate. Although certain proposals have been made regarding the improvement of the impact characteristics and external appearance of such RMCs and their fluidity upon molding, there is still room for improvements. For example, Japanese Patent Publication No. 4934/1983 discloses the use of a specific rubbery polymer. There is however still room for improvements in external appearance and impact characteristics and also in fluidity upon molding. It is also disclosed in U.S. Pat. No. 4,421,895 the use of a particular organic peroxide in a specific amount, a specific rubbery polymer and a solvent so as to control the particle size of the rubbery polymer. Nothing is however disclosed for the attainment of objects of this invention, which will be described next.

SUMMARY OF THE INVENTION

An object of this invention is to provide an anionically-polymerized-rubber-modified styrene copolymer having high fluidity upon molding. Another object of this invention is to provide an anionically-polymerized-rubber-modified styrene copolymer which can provide a molded article having high impact strength, a high gloss at the flow end at the time of injection molding, a reduced difference in gloss between the gate portion and the flow end, and reduced molding marks which occur near the gate at the time of molding, namely, excellent external appearance. A further object of this invention is to provide a resin material suitable for use in the production of molded articles which are molded by injection molding and have a thin wall and a complex configuration.

The above objects of this invention can be attained by an anionically-polymerized-rubber-modified styrene copolymer having the following characteristics:

(A) said copolymer contains, as an impact strength modifier, 5–35 wt. % of a butadiene-based rubbery polymer having a viscosity of 2–150 centipoises as measured at 25° C. in the form of a 5 wt. % styrene solution, containing less than 0.1 wt. % of styrene-insoluble components and produced by anionic polymerization;

(B) said rubbery polymer is dispersed as particles, in which small particles of a copolymer (SA copolymer) of a styrene-type monomer (ST) and an acrylonitrile-type monomer (AN) are occluded in the form of cells, in a continuous phase of the same SA copolymer;

(C) in an electron micrograph of ultrathin section of said anionically-polymerized-rubber-modified styrene copolymer, the percentage of the areas of rubber particles (R2) in each of which the maximum cell diameter is smaller than 0.1 μm is at least 40% when the area of all the rubber particles is assumed to be 100%;

(D) in the electron micrograph of ultrathin section, the volume average particle size of the rubber particles of R2 is 0.1–0.4 μm;

(E) the weight ratio of the monomers in the SA copolymer is expressed by 90/10 > ST/AN > 55/45; and (F) per 100 parts by weight of the SA copolymer making up the continuous phase, the proportion of polymers having a molecular weight greater than 1,000,000 is smaller than 0.5 part by weight and the proportion of polymers having a molecular weight greater than 1,200,000 is smaller than 0.01 part by weight.

The copolymer of this invention can be used as a molding material, for example, for components of electrical equipment, automobiles and the like, and specifically for housings and the like of telephones and computers by way of example.

BRIEF DESCRIPTION OF THE DRAWINGS

FIGS. 1(a) and 1(b) show the shape of a molded article employed in a practical impact test, and FIG. 1(a) is a plan view of the molded article whereas FIG. 1(b) is its cross-sectional view.

DETAILED DESCRIPTION OF THE INVENTION

The RMC according to this invention must contain, as an impact strength modifier, a rubbery polymer produced by anionic polymerization and having (a) a viscosity of 2–250 centipoises as measured at 25° C. as a 5 wt.% styrene solution and (b) less than 0.1 wt.% of styrene-insoluble components. Although conventional ABS resins generally use a rubber latex prepared by an emulsion polymerization process making use of radical polymerization, the RMC of this invention contains, as an impact strength modifier, a rubbery polymer which is produced by anionic polymerization and is substantially soluble in styrene. Such a rubbery polymer has a viscosity of 2-250 centipoises, preferably 2-200 centipoises, and most preferably 2-70 centipoises as measured at 25° C. as a 5 wt.% styrene solution. Viscosities lower than 2 centipoises result in low impact strength, while viscosities higher than 250 centipoises make it practically difficult to produce the composition according to this invention. Further, the content of styrene-insoluble components must be lower than 0.1 wt.%. If it is 0.1 wt.% or higher, the characteristic external appearance of this invention cannot be attained.

The butadiene-based rubbery polymer produced by anionic polymerization a referred to in this invention should be distinguished from a rubbery polymer produced by radical polymerization. The latter rubbery polymer cannot satisfy the objects of this invention in gloss, impact strength and other properties. Such rubbery polymers produced by anionic polymerization are those produced in the presence of a Ziegler catalyst, Co catalyst or Li catalyst by solution polymerization, including for example those exemplified by Koji Saeki in "Polymer Production Process", pp. 219-272, Kogyo Chosakai, Tokyo, 1971. Polybutadiene rubber, butadiene-styrene copolymers and other copolymers may be mentioned by way of example, with butadiene-styrene copolymers being particularly preferred.

The proportion of the rubbery polymer is 5-35 wt.% of the RMC. Any proportions smaller than 5 wt.% lead to RMCs, the impact strength of which is so low that when formed into molded articles, their practical strength is insufficient. On the other hand, any proportions greater than 35 wt.% lead not only to resins of reduced fluidity upon molding but also to molded articles of deteriorated external appearance. It is hence not preferred to add the rubbery polymer in any proportion outside the above range.

The RMC of this invention notionally forms a so-called sea-islets structure seen in general rubbermodified styrene resins and composed of rubber phases and a styrene-acrylonitrile (SA) polymer phase. Namely, the rubbery polymer is dispersed in the form of particles in the RMC and forms dispersed phases. On the other hand, the copolymer of the styrene-type monomer, acrylonitrile-type monomer and in some instances, one or more monomers (hereinafter collectively called "SA copolymer") makes up a continuous phase. Incidentally, the above dispersed phase also contains the SA copolymer in a form either grafted or occluded. When observed on an electron micrograph of ultrathin section (hereinafter simply called "electron micrograph"), the dispersed phases are contained as islets while the continuous phase is contained in the form of sea. The continuous phase is a portion having such properties that it is dissolved with a 7:3 (v/v) mixed solvent of methyl ethyl ketone and methanol. On the other hand, the dispersed phases are not dissolved with the mixed solvent.

The term "cells" as used herein mean small particles observed inside particles of the rubbery polymer as dispersed phases on the electron micrograph. These small particles are formed of the SA copolymer or the like grafted on or occluded in the rubbery polymer. Upon taking an electron micrograph of the RMC, the rubbery polymer is stained by osmium or the like, while the small particles are portions which remain free from staining like the continuous phase.

As examples of the rubber particles and cells in such an electron micrograph, a rubber-polystyrene system is illustrated, for example, by N.M. Bikales, et. in FIG. 5 on page 217 of "Encyclopedia of Polymer Science and Technology", vol. 13, p. 217, John Wiley & Sons, New York, 1970. In this example, acrylonitrile is not contained and the copolymer is thus different from the copolymer of this invention in this regard. However, the rubber particles and cells are essentially equal to those in the present invention. Namely, the rubber particles are spread substantially throughout FIG. 5 and the cells are in turn dispersed in the rubber particles. FIG. 5 shows rubber particles in each of which the maximum cell size is 0.1 $\mu$m or greater.

Although no particular limitation is imposed on the process for the production of the copolymer useful in the practice of this invention, the copolymer may preferably be produced, for example, by continuous bulk or solution polymerization. As one example of such a production process, the rubbery polymer is charged into a liquid mixture containing the styrene-type monomer and acrylonitrile-type monomer and is dissolved under stirring and in some instances, by controlling the temperature at 20°-70° C. The thus-prepared solution is then fed to a reactor. The solution is polymerized in a reactor of at least a single stage, preferably, of two or more stages equipped with a stirrer. From the final stage of the polymerization, the copolymer is obtained by way of a removal step for volatile components in which solid components and volatile components such as the unreacted monomers and solvent are separated from each other. In the above process, the rubbery polymer dissolved in the monomers is fed to the first-stage polymerizer. On the other hand, the monomers, a polymerization initiator and a chain transfer agent are supplied to the reactor at a desired stage.

Although the above-described continuous solution or bulk polymerization is preferred for the production of the anionically-polymerized-rubber-modified styrene copolymer of this invention, the rubber-modified styrene copolymer obtained by the above process contains the rubbery polymer, which has been produced by anionic polymerization, as rubber particles and cannot be produced when the styrene-type monomer and acrylonitrile-type monomer are added to a rubber latex prepared by the so-called emulsion polymerization and the resultant mixture is subjected to graft polymerization.

When the area of all the rubber particles is assumed to be 100% in an electron micrograph of the RMC of this invention, the percentage of the areas of rubber particles (R2) in each of which the maximum cell diameter is smaller than 0.1 $\mu$m must be at least 40%, preferably at least 55%.

If the percentage of the areas of the rubber particles of R2 is smaller than 40%, the resulting resin has poor fluidity and leads to a molded article having low impact strength and poor external appearance.

The volume average particle size of the rubber particles of R2 in the electron micrograph is 0.1-0.4 $\mu$m, with 0.15-0.35 $\mu$m, notably, 0.18-0.32 $\mu$m being preferred. Average particle sizes smaller than 0.1 $\mu$m result in molded articles having inferior impact strength Average particle sizes greater than 0.4 $\mu$m result in molded articles having inferior impact strength and a lowered gloss.

The volume average particle size (x) is measured in the following manner.

An electron micrograph (magnified 10,000 ×) of the copolymer is taken by the ultrathin slice technique. The particle sizes of 500–700 rubber particles in the micrograph are measured and then averaged in accordance with the following equation. $D_i$ means the average diameter of the i-th rubber particle.

Volume average particle size x (μm)

$$\text{Volume average particle size} \times (\mu m) = \sum_i n \cdot D_i^4 / \sum_i n \cdot D_i^3$$

wherein n means the total number of the rubber particles.

Incidentally, the rubber particles in the RMC may include rubber particles (R1), in each of which the maximum cell diameter is at least 0.1 μm, besides rubber particles (R2) in each of which the maximum cell diameter is smaller than 0.1 μm. Upon determination of the average particle size by the above-described method in this case, the volume average particle size is determined after classifying the rubber particles into R1 and R2. Where the rubber particles and cells are elliptical in the electron micrograph, the diameter (d) of each of the rubber particles and cells is given by the average of its major axis (a) and minor axis (b). Namely, $d=(a+b)/2$.

In addition to the rubber particles of R2, the RMC of this invention may contain, as rubber particles, rubber particles (R1) having a maximum cell diameter of at least 0.1 μm in a proportion such that when the area of all the rubber particles is assumed to be 100%, the area of the rubber particles (R1) accounts for 2–60%. In this case, the impact strength is improved. The inclusion of such additional rubber particles of R1 therefore preferred.

Where the RMC contains both R1 and R2, the total area of R1 may preferably be 2–50% with 2–45% being more preferred, and the total area of R2 may preferably be 98–50% with 98–55% being more preferred. If the total area of R1 exceeds 60%, the resultant resin is low in fluidity and impact strength and can only provide a molded article having poor external appearance. If the total area of R2 exceeds 98%, the improvement in the impact strength is somewhat low. Proportions of R2 smaller than 40% can only give resins of reduced fluidity and impact strength, resulting in molded articles having poor external appearance. The volume average particle size of the rubber particles of R1 in the electron micrograph must be 0.3–4.0 μm, preferably 0.4–2.0 μm, more preferably 0.4–1.5 μm and most preferably 0.4–1.0 μm.

In the RMC according to this invention, the rubbery polymer produced by anionic polymerization is dispersed as rubber particles of R2 or rubber particles of R1 and R2. In order to form a rubbery polymer as rubber particles of R2 out of these rubber particles, a butadiene-styrene block copolymer of the styrene(S)-butadiene (B) type or S-B-S type may be used preferably. Among butadiene-styrene block copolymers, those having a styrene content of 3–28 wt.%, preferably, 15–27 wt.% may be used desirably for the attainment of the objects of this invention. If the styrene content is smaller than 3 wt.%, it is difficult to provide a molded article having the characteristic external appearance of this invention if the resulting copolymer is designed to have sufficient fluidity upon its molding. On the other hand, styrene contents higher than 28 wt.% result in reduced impact strength. Further, the microstructure of butadiene portions in the styrene-butadiene copolymer may contain preferably 5–25 mole %, more preferably 10–23 mole % of 1,2-vinyl bonds in butadiene moieties. Proportions smaller than 5 mole % result in copolymers having low impact strength. Proportions greater than 25 mole % also lead to copolymers having low impact strength.

The S-B or S-B-S type styrene-butadiene copolymer useful in the practice of this invention may preferably have a viscosity of 40–2 centipoises, more preferably, 19–2 centipoises as measured at 30° C. as a 5 wt.% styrene solution. It is particularly preferred that the viscosity (v) of the styrene-butadiene copolymer as measured as a 5 wt.% styrene solution satisfies the following equation:

$$0.5S - 7 \leq v \leq 0.5S + 3$$

wherein S is represented by $100z/(y+z)$ [$S=100z/(y+z)$] in which y and z mean respectively the proportions of the styrene-type and acrylonitrile-type monomers in terms of parts by weight per 100 parts by weight of the RMC.

In addition, the rubber particles of R1 and R2 must contain the copolymer of the styrene-type monomer and acrylonitrile-type monomer in an occluded and/or grafted form. The proportion of such an occluded and/or grafted copolymer may be 10–100 parts by weight, preferably 15–60 parts by weight, most preferably 20–50 parts by weight per 100 parts by weight of the rubbery polymer. Any proportions smaller than 10 parts by weight lead to low impact strength, while any proportions greater than 100 parts by weight cannot attain the object in external appearance, especially, in gloss.

The proportion (w) of the copolymer of the styrene-type monomer and acrylonitrile-type monomer, which is occluded in and/or grafted on the rubber particles in the RMC, per 100 parts by weight of the rubbery polymer is determined in the following manner. Namely, a gram of the RMC (about 1 g is weighed precisely) is dispersed in a 7.3 (v/v) mixed solvent of methyl ethyl ketone and methanol, insoluble matter is separated by centrifugation and dried, the weight (b g) of the insoluble matter is weighed precisely, and the proportion (w) is calculated by the following equation:

$$w \text{ (parts by weight)} = \left\{ \frac{b}{a \times \frac{c}{100}} - 1 \right\} \times 100$$

wherein c means the content (wt.%) of the rubbery polymer in the RMC. Where the RMC contains an additive insoluble in the solvent, the values obtained by subtracting the weight of the additive from the values a,b are used as a and b. c is the proportion of the rubbery polymer based on the sum of the rubbery polymer and the copolymer of the styrene-type monomer and acrylonitrile-type monomer in the RMC. Such a value w may be controlled, for example, in the following manner. Namely, the value w may be controlled by the polymerization initiator, the intensity of stirring, the amount of the rubbery polymer to be used, the amounts and kinds of the monomers, the molecular weight regulator, the final polymerization degree, conditions for the removal step for volatile components. In general, the value w tends to increase as the amount of the polymerization initiator increases, the intensity of stirring decreases, the diene content of the rubbery polymer increases, the proportion of the rubbery polymer decreases, the proportion of the styrene-type monomer increases, or the temperature of the removal step for volatile components increases. A person skill in the art can control the value w to a desired level by adjusting such parameters in accordance with the trial and error method.

The formation of R1 and R2 in the RMC of this invention may be achieved by using, as a rubbery polymer, one produced by anionic polymerization. When the formation is conducted by a two-stage bulk polymerization process by way of example, the formation may be attained by adjusting the conversion of the monomers into the copolymer in the first stage of the abovementioned step while using 0.001-0.2 part by weight of an organic peroxide per 100 parts by weight of the monomers in the first-stage polymerization reaction. It is generally preferred to use a small amount of a solvent and as a molecular weight regulator, a chain transfer agent. The chain transfer agent may be added in a proportion of 10-1000 ppm of the sum of the monomers, especially, in an initial stage of the reaction, for example, in a stage where the polymerization conversion is lower than 30 wt.%. A mercaptan such as n- or t-dodecylmercaptan may be used preferably by way of example. The reaction may be carried out preferably at 50°-120° C. The cell diameter tends to become greater as the stirring is reduced, more solvent and chain transfer agent are used, less organic peroxide is used, the molecular weight of the rubbery polymer increases, and the conversion becomes greater. This control may be achieved by those skilled in the art in accordance with the trial and error method. In order to make the cells smaller, a styrenebutadiene copolymer may be used as a preferable rubbery polymer, with a styrene-butadiene block copolymer being more preferred.

As to the ratio of the monomers in the SA copolymer in the RMC of this invention, the ratio of the styrene-type monomer to the acrylonitrile-type monomer must satisfy the following equation: $90/10 > ST/AN > 55/45$, preferably $86/14 > ST/AN > 65/35$, more preferably $86/14 > ST/AN > 69/31$. If the ST/AN exceeds 90/10, the impact strength decreases considerably. Any ST/AN ratios smaller than 55/45 however result in extremely poor fluidity. The objects of this invention cannot therefore be attained outside the above range.

Per 100 parts by weight of the SA copolymer forming the continuous phase in the RMC of this invention, the proportion of polymers having a molecular weight greater than 1,000,000 should be smaller than 0.5 part by weight while the proportion of polymers having a molecular weight greater than 1,200,000 should be smaller than 0.01 part by weight. The proportion of polymers having a molecular weight greater than 1,000,000 may preferably be smaller than 0.2 part by weight, more preferably, smaller than 0.1 part by weight. If the proportion of polymers having a molecular weight greater than 1,000,000 is 0.5 part by weight or more or the proportion of polymers having a molecular weight greater than 1,200,000 is 0.01 part by weight or greater, the external appearance and fluidity are both reduced even if the other requirements of the present invention are satisfied. Although it has heretofore been attempted to enhance the strength of a styrene-based resin by increasing its molecular weight, the present inventors have found that an extremely large molecular weight is unnecessary from the viewpoint of fluidity and impact strength and is harmful from the standpoint of external appearance. By satisfying these requirements, it is possible to retain high impact strength while maintaining the external appearance and fluidity at high levels. Although reasons for this advantage have not been elucidated, it may probably be attributed to certain interaction between the properties of the rubber particles and the properties of the SA copolymer in the continuous phase. The respective proportions of molecular weights in the SA copolymer of the continuous phase may be measured by a usual method in the following manner.

The RMC is dispersed in a 7:3 (v/v) mixed solvent of methyl ethyl ketone and methanol. Components insoluble in the mixed solvent are removed by centrifugation, and the solvent containing soluble components is poured into about 20 volumes of methanol so as to reprecipitate the soluble components. After collecting the resulting precipitate by filtration and drying same, its weight is measured. For the measurement, gel permeation chromatography is employed. A calibration curve of elution volumes vs. molecular weights is prepared in advance by using a standard sample of polystyrene, so that it is used as a reference for the molecular weight of the above-dried precipitate. Incidentally, polymers having a molecular weight smaller than 1,000 are excluded upon measurement. In this invention, a preferable molecular weight distribution may be attained by continuous bulk or solution polymerization.

In the RMC of this invention, the reduced viscosity of the SA copolymer in the continuous phase as measured at 30° C. as a 0.5 wt.% dimethylformamide (DMF) solution may preferably be 0.5-1.0 dl/g, with 0.6-0.9 dl/g being more preferable and 0.6-0.85 dl/g being particularly preferred. If the above value exceeds 1.0, the fluidity is deteriorated. Any values smaller than 0.5 lead to a reduction in impact strength. The reduced viscosity is obtained by measuring the above dry precipitate.

In the RMC of this invention, the crosslinking index of the dispersed phases may be preferably 8-16 times, more preferably 9-14 times and most preferably 10-14 times. The crosslinking index of such dispersed phases can be determined by the following method.

The RMC (0.4g) is dissolved partially in 30 cc of a 7:3 (v/v) mixed solvent of toluene and methyl ethyl ketone. After centrifugation, the weight of an insoluble matter swollen with the solvent is measured ($W_1$). After the weighing, the insoluble matter is dried in vacuo and is weighed again ($W_2$). The crosslinking index is given by $W_1/W_2$. Such crosslinking index is dependent on the amount and kind of the polymerization initiator and the temperature and residence time at the devroatilization step. It also depends on the amount of a maleimide-type monomer which may be used optionally as will be described subsequently. A suitable crosslinking index can be set by a person skilled in the art by choosing appropriate conditions for the production process in accordance with the trial and error method. If the crosslinking index is smaller than 8, the impact strength is low and the fluidity is also low. On the other hand, any crosslinking indices greater than 16 result in lower practical impact strength.

As illustrative examples of the "styrene-type monomer" as used herein, may be mentioned styrene, side chain alkyl-substituted styrene such as α-methylstyrene and α-ethylstyrene, nucleus alkyl-substituted styrenes such as monochlorostyrene, dichlorostyrene, vinyltoluene, vinylxylene, o-t-butylstyrene, p-t-butylstyrene and p-methylstyrene, halogenated styrenes such as tribromostyrene and tetrabromostyrene, p-hydroxystyrene, o-methoxystyrene, vinylnaphthalene, etc. Particularly preferred are styrene and α-methylstyrene. Such styrene-type monomers may be used either singly or in combination.

Illustrative examples of the "acrylonitrile-type monomer" as used herein may include acrylonitrile, methacrylonitrile, fumaronitrile, maleonitrile, α-chloroacrylonitrile and the like. Acrylonitrile is particularly preferred. Such monomers may be used either singly or in combination.

In the present invention, a portion of either one or both of the styrene-type monomer and acrylonitrile-type monomer as the components of the copolymer may be replaced by one or more of methacrylic ester monomers such as methyl methacrylate, acrylic ester monomers such as methyl acrylate and maleimide monomers such as maleimide and N-phenylmaleimide to an extent not more than 30 wt.% of the sum of the styrene-type monomer and acrylonitrile-type monomer. Replacement by 1–30 parts by weight of a maleimide-type monomer is preferred when it is desired to improve the heat resistance.

The anionically-polymerized-rubber-modified copolymer of this invention may be combined with a conventional antioxidant such as hindered phenolic antioxidant, phosphorus-based antioxidant or sulphur-based antioxidant to improve the heat stability or with a lubricant to improve the fluidity further. It is also possible to incorporate a fibrous reinforcing agent such as glass fibers, an inorganic filler, a colorant and/or a pigment, depending on what end use will be made. It is also possible to impart flame retardancy to the anionically-polymerized-rubber-modified styrene of this invention by adding a conventional flame retardant of the halogenated organic compound type, such as tetrabromobisphenol A, decabromobiphenyl ether or brominated polycarbonate, along with antimony oxide.

The anionically-polymerized rubber-modified styrene copolymer of this invention may be provided for molding after blending it with one or more of resins such as ABS resin, polyvinyl chloride, styrene-acrylonitrile resins, polycarbonates, polybutylene terephthalate, nylon 6, nylon 66, nylon 12, polyphenylene oxide and polyphenylene sulfide.

Specific embodiments of the present invention will hereinafter be described by Examples and Comparative Examples. It should however be borne in mind that the present invention is not limited to or by the following Examples and Comparative Examples.

In the following Examples and Comparative Examples, the analyses and property evaluation of rubber-modified styrene copolymers were conducted by the following methods.

ANALYSES (1) Rubber content: Assuming that the total amount of each resin is 100 parts by weight, the content of rubber in the resin was determined from the balance of the amount of the rubber charged in the reaction step and the amount of the resultant copolymer as will be described in Example 1.

(2) Average rubber particle size (x μm): The method described above was followed.

(3) Ratio of a styrene-type monomer (y parts by weight) to an acrylonitrile-type monomer (z parts by weight) in the copolymer (y+z parts by weight) of the monomers, y/z: Determined from the material balance between the amounts of the monomers charged in the reaction step and the amounts of the monomers recovered by way of a vacuum tank. By the way, y/z was also determined from the datum of the element N in an elemental analysis of each SA copolymer for the sake of confirmation. The thus-obtained value was in conformity with the value determined from the material balance.

(4) Proportion of polymers having molecular weights greater than 1,000,000 and 1,200,000 respectively: The method described above was followed.

(5) Determination of cell sizes: The method described above was followed. Evaluation of physical properties:

1. Molding:

After drying each resultant copolymer at 90° C. for 3 hours, it was molded by an injection molding machine at a molding temperature of 240° C. and a mold temperature of 40° C.

2. Evaluation:

(1) Izod impact strength: Evaluated in accordance with JIS K-7110.

(2) Gloss: Evaluated in accordance with JIS K-7105. Rectangular molded articles of 50 mm wide, 2.5 mm thick and 150 mm long were injection-molded. A gate was 50 mm wide and 0.1 mm thick and was provided at one end in the longitudinal direction. The gate portion was the starting point of flow, while the edge opposite to the gate was the flow end. The gloss of a square portion of 5 mm × 5 mm centered at the midpoint of a distance of 25 mm from the gate portion was recorded as the gloss of the gate portion. The gloss of another square portion centered at the midpoint of a distance of 25 mm from the opposite edge was recorded as the gloss of the flow end portion. Incidentally, the differences in gloss among gate portions of different RMCs are smaller than differences in gloss among leading flow end portions of the same RMCs, the gloss of the leading flow end portion is significantly lower than the gloss of the corresponding gate portion, and in use, the gloss of the flow end portion is important from the standpoint of external appearance.

(3) Evaluation of practical impact strength: A dart impact strength test was performed at 3 locations on each molded article obtained by injection molding and having a shape shown in FIGS. 1(a) and 1(b), namely, at Location (1), Location (2) and Location (3). The radius (R) of a tip portion of the dart was 6.4 mm (R=6.4 mm), while the inner diameter of a base was 20 mm. The thickness varies at Location (1), Location (2) is close to a corner, and Location (3) is a standard location.

(4) Marks of molding near the gate: Marks appeared on gloss-free portions near gates (indicated at "G") of molded articles of the shape depicted in FIGS. 1(a) and 1(b) were compared relatively between the Examples of the present invention and the Comparative Examples. With respect to each copolymer, 10 molded articles were each ranked by allotting 2 points where no substantial marks were observed or 1 point where marks were observed. The degree of marks was indicated by the average point of the 10 molded articles. By the way, the gate was a pinpoint gate whose diameter was 1 mm.

(5) Evaluation of fluidity upon molding: Evaluated in terms of hydraulic pressure (short shot hydraulic pressure) of a molding machine, which was required for the production of the lowest injection pressure not developing short shot in injection molding. Using a commercial high-stiffness ABS resin (control) produced by emulsion polymerization as a reference, the fluidity was relatively evaluated by the difference in short shot hydraulic pressure. Where the difference is negative, the hydraulic pressure is indicated to be lower than that of the control and the material is hence judged to exhibit good fluidity upon molding.

EXAMPLE 1

A rubber-modified styrene copolymer was produced by using a continuous bulk polymerization apparatus which was constructed of three stirrer-equipped reactors connected in series and a preheater and a vacuum tank connected successively to an outlet of the last, i.e, third reactor. Employed as a rubbery polymer was a block styrene-butadiene rubber (styrene 19%, butadiene 81%; the microstructure of the butadiene portions was composed of 17 mole % of vinyl bonds, 47 mole % of the trans-structure and 36 mole % of the cis-structure; the viscosity was 12 centipoises as measured at 25° C. as a 5 wt.% styrene solution). Five parts by weight of the rubbery polymer were poured into a mixed solution which was formed of 32 parts by weight of ethylbenzene, 52.5 parts by weight of styrene and 17.5 parts by weight of acrylonitrile, whereby a rubber solution was prepared. The rubber solution was continuously charged into the first reactor to perform its polymerization. After the third reactor, the reaction mixture was allowed to flow through the preheater maintained at a temperature of 230°–250° C., the unreacted monomers and the solvent were removed in the vacuum tank operating at 120 torr, and the resultant resin was continuously drawn out of the vacuum tank to obtain a rubber-modified styrene copolymer. An organic peroxide (150 ppm) was used as a polymerization initiator, while dodecyl mercaptan was employed as a molecular weight regulator. The amount of the rubbery polymer in the rubber-modified styrene copolymer was calculated from the feed amounts of the charged raw materials and the amount of the thus-obtained copolymer. The stirring speed of the first reactor was set at 170 rpm.

Analytical results of the rubber-modified styrene copolymer and evaluation results of its physical properties are shown in Table 1-1 and Table 1-2 respectively.

COMPARATIVE EXAMPLE 1

Using a polybutadiene rubber latex different from the rubbery polymer of this invention, a rubbermodified styrene copolymer was obtained by emulsion polymerization. Using the polybutadiene rubber latex (solids content: 20%; volume average particle of the latex: 0.20 μm), polymerization was conducted while continuously adding styrene and acrylonitrile.

Evaluation results are also shown in Table 1-1 and Table 1-2 respectively.

The impact strength and fluidity were low. The total content of styrene-insoluble components in the rubber latex employed was 5%.

COMPARATIVE EXAMPLES 2–3 AND EXAMPLES 2–3

Rubber-modified styrene copolymers were separately obtained in the same manner as in Example 1 except that rubbery polymers shown in Table 1-1 were used respectively. Analytical results and evaluation results are also shown in Table 1-1 and Table 1-2 respectively.

COMPARATIVE EXAMPLES 4–5 AND EXAMPLES 4–5

Rubber-modified styrene copolymers were separately obtained in the same manner as in Example 1 except that the charges were varied to change the styrene(ST)-to-acrylonitrile(AN) ratio as shown in Table 2-1. Analytical results and evaluation results are shown in Table 2-1 and Table 2-2 respectively.

EXAMPLES 6–7

Rubber-modified styrene copolymers were separately obtained in the same manner as in Example 1 except that the rubbery polymer of Table 2-1 was used and the temperature of the preheater was changed to about 280° C. and about 210° C. respectively. Analytical results and evaluation results are shown in Table 2-1 and Table 2-2 respectively.

EXAMPLES 8–11 AND COMPARATIVE EXAMPLE 7

Rubber-modified styrene copolymers were separately obtained by mixing the rubber-modified styrene copolymers of Example 1 and Comparative Example 2. Analytical results and evaluation results are shown in Table 3-1 and Table 3-2 respectively.

EXAMPLES 12–13 AND COMPARATIVE EXAMPLE 8–9

Rubber-modified styrene coplymers were separately obtained by changing the charging ratio of the raw materials and the final polymerization degree and hence the content of the rubbery polymer. Analytical results and evaluation results are shown in Table 4-1 and Table 4-2 respectively.

EXAMPLES 14

Rubber-modified styrene copolymers were separately obtained in the same manner as in Example 1 except that phenylamaleimide was added in prescribed amounts to the raw materials to be fed to the first reactor. Analytical results and evaluation results are shown in Table 5-1 and Table 5-2 respectively.

TABLE 1-1

|  | Ex. 1 | Comp. Ex. 1 | Comp. Ex. 2 | Ex. 2 | Ex. 3 | Comp. Ex. 3 |
|---|---|---|---|---|---|---|
| Rubbery polymer | | | | | | |
| Polymerization process | Anionic | Emulsion | Anionic | Anionic | Anionic | Anionic |
| Styrene, wt. % | 19 | 19 | 0 | 19 | 13 | 25 |
| 1,2-vinyl, mole % | 17 | 20 | 18 | 18 | 18 | 18 |
| Solution viscosity, cps | 12 | — | 50 | 18 | 8 | 1 |
| Styrene-insoluble components, wt. % | 0.02 | 5 | 0.02 | 0.02 | 0.02 | 0.02 |
| Copolymer | | | | | | |
| Content of rubbery polymer, % | 15 | 15 | 15 | 15 | 15 | 15 |

TABLE 1-1-continued

|  | Ex. 1 | Comp. Ex. 1 | Comp. Ex. 2 | Ex. 2 | Ex. 3 | Comp. Ex. 3 |
|---|---|---|---|---|---|---|
| Area of R1, % | 2 | 3 | 98 | 7 | 0 | 0 |
| Area of R2, % | 98 | 97 | 2 | 93 | 100 | 100 |
| Volume average particle size of R1, $\mu$m | — | — | — | — | — | — |
| Volume average particle size of R2, $\mu$m | 0.25 | 0.20 | 0.29 | 0.25 | 0.15 | 0.08 |
| ST/AN | 75/25 | 75/25 | 75/25 | 75/25 | 75/25 | 75/25 |
| Portion of styrene copolymer (m.w. >1,000,000), wt. part | 0 | 2.1 | 0 | 0 | 0 | 0 |
| Portion of styrene copolymer (m.w. >1,200,000), wt. part | 0 | 0.7 | 0 | 0 | 0 | 0 |
| Occluded/grafted copolymer ratio on rubber particles | 30 | 17 | 75 | 40 | 29 | 15 |
| Reduced viscosity of SA copolymer, dl/g | 0.68 | 0.68 | 0.68 | 0.68 | 0.68 | 0.68 |
| Crosslinking index | 12 | 12 | 12 | 12 | 12 | 12 |

TABLE 1-2

|  | Ex. 1 | Comp. Ex. 1 | Comp. Ex. 2 | Ex. 2 | Ex. 3 | Comp. Ex. 3 | Control |
|---|---|---|---|---|---|---|---|
| Izod impact strength, kg·cm/cm | 13 | 14 | 10 | 14 | 11 | 5 | 9 |
| Gloss, % |  |  |  |  |  |  |  |
| Gate portion | 95 | 93 | 71 | 93 | 93 | 98 | 92 |
| Flow end portion | 94 | 85 | 54 | 92 | 90 | 98 | 84 |
| Dart impact strength, kg·cm/cm |  |  |  |  |  |  |  |
| Location (1) | 38 | 38 | 40 | 40 | 30 | 5 | 25 |
| Location (2) | 53 | 40 | 42 | 54 | 45 | 6 | 27 |
| Location (3) | 70 | 68 | 56 | 70 | 52 | 6 | 48 |
| Marks near the gate (ranking) | 2 | 1 | 1 | 2 | 2 | 2 | 1.7 |
| Hydraulic pressure difference in short shot kg/cm$^2$ | −5 | −1 | −4 | −5 | −5 | −5 | reference |

TABLE 2-1

|  | Comp. Ex. 4 | Ex. 4 | Ex. 5 | Comp. Ex. 5 | Ex. 6 | Ex. 7 |
|---|---|---|---|---|---|---|
| Rubbery polymer |  |  |  |  |  |  |
| Polymerization process | Anionic | Anionic | Anionic | Anionic | Anionic | Anionic |
| Styrene, wt. % | 19 | 19 | 19 | 19 | 19 | 19 |
| 1,2-vinyl, mole % | 17 | 17 | 17 | 17 | 17 | 17 |
| Solution viscosity, cps | 12 | 12 | 12 | 12 | 12 | 12 |
| Styrene-insoluble components, wt. % | 0.02 | 0.02 | 0.02 | 0.02 | 0.02 | 0.02 |
| Copolymer |  |  |  |  |  |  |
| Content of rubbery polymer, % | 15 | 15 | 15 | 15 | 15 | 15 |
| Area of R1, % | 5 | 8 | 12 | 15 | 10 | 10 |
| Area of R2, % | 95 | 92 | 88 | 85 | 90 | 90 |
| Volume average particle size of R1, $\mu$m | — | — | — | — | — | — |
| Volume average particle size of R2, $\mu$m | 0.20 | 0.22 | 0.28 | 0.28 | 0.25 | 0.25 |
| ST/AN | 95/5 | 86/14 | 69/31 | 50/50 | 75/25 | 75/25 |
| Portion of styrene copolymer (m.w. >1,000,000), wt. part | 0 | 0 | 0 | 0 | 0 | 0 |
| Portion of styrene copolymer (m.w. >1,200,000), wt. part | 0 | 0 | 0 | 0 | 0 | 0 |
| Occluded/grafted copolymer ratio on rubber particles | 28 | 30 | 30 | 35 | 35 | 25 |
| Reduced viscosity of SA copolymer, dl/g | 0.66 | 0.66 | 0.70 | 0.75 | 0.67 | 0.68 |
| Crosslinking index | 14 | 14 | 12 | 10 | 7 | 18 |

TABLE 2-2

|  | Comp. Ex. 4 | Ex. 4 | Ex. 5 | Comp. Ex. 5 | Ex. 6 | Ex. 7 |
|---|---|---|---|---|---|---|
| Izod impact strength, kg·cm/cm | 5 | 10 | 13 | 13 | 8 | 9 |
| Gloss, % |  |  |  |  |  |  |
| Gate portion | 96 | 95 | 94 | 91 | 95 | 93 |
| Flow end portion | 94 | 93 | 91 | 85 | 93 | 90 |
| Dart impact strength, kg·cm/cm |  |  |  |  |  |  |
| Location (1) | 5 | 29 | 35 | 31 | 25 | 19 |
| Location (2) | 5 | 50 | 49 | 52 | 41 | 43 |
| Location (3) | 6 | 62 | 72 | 73 | 45 | 50 |
| Marks near the gate (ranking) | 2 | 2 | 2 | 1 | 2 | 2 |
| Hydraulic pressure differ- | −10 | −7 | −4 | +5 | −5 | −5 |

TABLE 2-2-continued

|  | Comp. Ex. 4 | Ex. 4 | Ex. 5 | Comp. Ex. 5 | Ex. 6 | Ex. 7 |
|---|---|---|---|---|---|---|
| ence in short shot kg/cm$^2$ | | | | | | |

TABLE 3-1

|  | Ex. 8 | Ex. 9 | Ex. 10 | Ex. 11 | Comp. Ex. 6 |
|---|---|---|---|---|---|
| Copolymer | | | | | |
| Content of rubbery polymer, % | 15 | 15 | 15 | 15 | 15 |
| Area of R1, % | 3 | 20 | 45 | 60 | 70 |
| Area of R2, % | 97 | 80 | 55 | 40 | 30 |
| Volume average particle size of R1, μm | 0.60 | 0.60 | 0.60 | 0.60 | 0.60 |
| Volume average particle size of R2, μm | 0.25 | 0.25 | 0.25 | 0.25 | 0.25 |
| ST/AN | 75/25 | 75/25 | 75/25 | 75/25 | 75/25 |
| Portion of styrene copolymer | | | | | |
| Molecular weight >1,000,000, wt. part | 0 | 0 | 0 | 0 | 0 |
| Molecular weight >1,200,000, wt. part | 0 | 0 | 0 | 0 | 0 |
| Occluded/grafted copolymer ratio on rubber particles | 28 | 32 | 40 | 50 | 65 |
| Reduced viscosity of SA copolymer dl/g | 0.68 | 0.68 | 0.68 | 0.68 | 0.68 |
| Crosslinking index | 12 | 12 | 12 | 12 | 12 |

TABLE 3-2

|  | Ex. 8 | Ex. 9 | Ex. 10 | Ex. 11 | Comp. Ex. 6 |
|---|---|---|---|---|---|
| Izod impact strength, kg · cm/cm | 14 | 18 | 16 | 15 | 13 |
| Gloss, % | | | | | |
| Gate portion | 95 | 93 | 87 | 81 | 78 |
| Flow end portion | 93 | 92 | 78 | 72 | 68 |
| Dart impact strength, kg · cm/cm | | | | | |
| Location (1) | 41 | 56 | 50 | 42 | 40 |
| Location (2) | 58 | 73 | 71 | 53 | 45 |
| Location (3) | 73 | 102 | 92 | 65 | 64 |
| Marks near the gate (ranking) | 2 | 2 | 2 | 1.5 | 1.2 |
| Hydraulic pressure difference in short shot kg/cm$^2$ | −5 | −5 | −5 | −5 | −4 |

TABLE 4-2

|  | Comp. Ex. 7 | Ex. 12 | Ex. 13 | Comp. Ex. 8 |
|---|---|---|---|---|
| Izod impact strength, kg · cm/cm | 3 | 10 | 19 | 25 |
| Gloss, % | | | | |
| Gate portion | 99 | 96 | 91 | 88 |
| Flow end portion | 98 | 95 | 87 | 82 |
| Dart impact strength, kg · cm/cm | | | | |
| Location (1) | 2 | 31 | 59 | 68 |
| Location (2) | 3 | 47 | 71 | 90 |
| Location (3) | 3 | 55 | 150 | 183 |
| Marks near the gate (ranking) | 2 | 2 | 1.8 | 1.2 |
| Hydraulic pressure difference in short shot kg/cm$^2$ | −7 | −6 | −3 | +2 |

TABLE 4-1

|  | Comp. Ex. 7 | Ex. 12 | Ex. 13 | Comp. Ex. 8 |
|---|---|---|---|---|
| Rubbery polymer | | | | |
| Polymerization process | Anionic | Anionic | Anionic | Anionic |
| Styrene, wt. % | 19 | 19 | 19 | 19 |
| 1,2-vinyl, mole % | 17 | 17 | 17 | 17 |
| Solution viscosity, cps | 12 | 12 | 12 | 12 |
| Styrene-insoluble components, wt. % | 0.02 | 0.02 | 0.02 | 0.02 |
| Copolymer | | | | |
| Content of rubbery polymer, % | 3 | 9 | 25 | 40 |
| Area of R1, % | 0 | 1 | 6 | 50 |
| Area of R2, % | 100 | 99 | 94 | 50 |
| Volume average particle size of R1, μm | — | — | — | — |
| Volume average particle size of R2, μm | 0.19 | 0.21 | 0.26 | 0.30 |
| ST/AN | 75/25 | 75/25 | 75/25 | 75/25 |
| Portion of styrene copolymer (m.w. >1,000,000), wt. part | 0 | 0 | 0 | 0 |
| Portion of styrene copolymer (m.w. >1,200,000), wt. part | 0 | 0 | 0 | 0 |
| Occluded/grafted copolymer ratio on rubber particles | 25 | 30 | 30 | 60 |
| Reduced viscosity of SA copolymer, dl/g | 0.68 | 0.68 | 0.68 | 0.68 |
| Crosslinking index | 12 | 12 | 12 | 12 |

TABLE 5-1

|  | Ex. 14 | Ex. 15 |
|---|---|---|
| Rubbery polymer |  |  |
| Polymerization process | Anionic | Anionic |
| Styrene, wt. % | 19 | 19 |
| 1,2-vinyl, mole % | 17 | 17 |
| Solution viscosity, cps | 12 | 12 |
| Styrene-insoluble components, wt. % | 0.02 | 0.02 |
| Copolymer |  |  |
| Content of rubbery polymer, % | 15 | 15 |
| Area of R1, % | 3 | 3 |
| Area of R2, % | 97 | 97 |
| Volume average particle size of R1, μm | — | — |
| Volume average particle size of R2, μm | 0.28 | 0.26 |
| ST/AN | 75/25 | 75/25 |
| Portion of styrene copolymer (m.w. >1,000,000), wt. part | 0 | 0 |
| Portion of styrene copolymer (m.w. >1,200,000), wt. part | 0 | 0 |
| Occluded/grafted copolymer ratio on rubber particles | 40 | 32 |
| Reduced viscosity of SA copolymer, dl/g | 0.63 | 0.65 |
| Crosslinking index | 10 | 10 |
| Amount of maleimide (MI)* | 20 | 10 |

*Wt. % of MI in ST, AN and MI.

TABLE 5-2

|  | Ex. 14 | Ex. 15 |
|---|---|---|
| Izod impact strength, kg · cm/cm | 10 | 11 |
| Gloss, % |  |  |
| Gate portion | 91 | 92 |
| Flow end portion | 87 | 90 |
| Dart impact strength, kg · cm/cm |  |  |
| Location (1) | 27 | 32 |
| Location (2) | 45 | 51 |
| Location (3) | 52 | 66 |
| Marks near the gate (ranking) | 1.7 | 1.9 |
| Hydraulic pressure difference in short shot kg/cm² | −3 | −4 |

We claim:

1. An anionically-polymerized-rubber-modified styrene copolymer wherein
   (A) said copolymer contains, as an impact strength modifier, 5-35 wt. % of a butadiene-based rubbery polymer which is produced by anionic polymerization, and has a viscosity of $2 \geq 70$ centipoises as measured at 15° C. as a 5 wt. % styrene solution and contains less than 0.1 wt. % of styrene-insoluble components,
   (B) said rubbery polymer is dispersed as particles, in which small particles of a copolymer (SA copolymer) of a styrene monomer (ST) and an acrylonitrile monomer (AN) are occluded in the form of cells in a continuous phase of the same SA copolymer.
   (C) in an ultrathin slice electron micrograph of ultrathin section of said anionically-polymerized-rubber-modified styrene copolymer, the percentage of the areas of first rubber particles ($R_1$) in each of which the maximum cell diameter is at least 0.1 μm is 2-60% while the percentage of the areas of second rubber particles ($R_2$) in each of which the maximum cell diameter is smaller than 0.1 μm is 98-40%, both, when the area of all the rubber particles is taken as 100%,
   (D) in the electron micrograph of ultrathin section, the volume average particle size of the first rubber particles ($R_1$) is 0.4-4 μm while the volume average particle size of the second rubber particles ($R_2$) is 0.15-0.35 μm,
   (E) the weight ratio of the monomers in the SA copolymer is expressed by $90/10 \geq 55/45$,
   (F) per 100 parts by weight of the SA copolymer making up the continuous phase, the proportion of polymers having a molecular weight greater than 1,000,000 is smaller than 0.5 part by weight and the proportion of polymers having a molecular weight greater than 1,200,000 is smaller than 0.01 part by weight, and
   (G) said rubbery polymer comprises a copolymer rubber in the form of an S-B-S block of styrene (S) and butadiene (B) or in the form of S-B block, and the microstructure of said copolymer rubber contains 2-25 mole % of 1,2-vinyl bonds.

2. The rubber-modified styrene copolymer as claimed in claim 1 wherein the styrene content of the S-B block copolymer rubber is 15-27 wt. %

3. The rubber-modified styrene copolymer as claimed in claim 1, wherein the copolymer has been obtained by replacing 1-3 parts by weight of the styrene monomer and/or acrylonitrile monomer with a maleimide monomer when the total amount of the styrene monomer and acrylonitrile monomer as components of the copolymer is assumed to be 100 parts by weight.

4. The rubber-modified styrene copolymer as claimed in claim 3, wherein the maleimide monomer is maleimide or N-phenylmaleimide.

5. The rubber-modified styrene copolymer as claimed in claim 1, wherein the rubbery polymer contains the SA copolymer particles occluded and/or grafted in an amount of 10-100 parts by weight per 100 parts by weight of the rubbery polymer.

6. The rubber-modified styrene copolymer as claimed in claim 1, wherein the styrene monomer is styrene or α-methylstyrene.

7. The rubber-modified styrene copolymer as claimed in claim 1, wherein the acrylonitrile monomer is acrylonitrile.

8. The rubber-modified styrene copolymer as claimed in claim 1, wherein the percentage of the areas of the first rubber particles ($R_1$) is 2-45% while the percentage of the areas of the second rubber particles ($R_2$) is 98-55%.

9. The rubber-modified styrene copolymer as claimed in claim 1, wherein the proportion of the polymers 10. The rubber-modified styrene copolymer as claimed in claim 1, wherein the copolymer has been obtained by replacing 1-30 parts by weight of the styrene monomer and/or acrylonitrile monomer with a maleimide monomer when the total amount of the styrene monomer and acrylonitrile monomer as components of the copolymer is taken as 100 parts by weight.

11. The rubber-modified styrene copolymer as claimed in claim 10, wherein the maleimide monomer is maleimide or N-phenylmaleimide.

* * * * *

UNITED STATES PATENT AND TRADEMARK OFFICE
CERTIFICATE OF CORRECTION

PATENT NO. : 4,972,024
DATED : November 20, 1990
INVENTOR(S) : Mune Iwamoto et al.

It is certified that error appears in the above-identified patent and that said Letters Patent is hereby corrected as shown below:

Claim 1, col. 1, line 44: Amend "2≧70" to --2-70--;

col. 1, line 45: Amend "15°C" to --25°C--;

col. 1, line 46: "wt. % of styrene-insoluble" appears in boldface typestyle. Please change to normal typestyle.

col. 1, line 47: "components," appears in boldface typestyle. Please change to normal typestyle.

col. 1, line 53: Amend "copolymer." to --copolymer,--;

col. 1, line 66: Amend "(R1)" to --$(R_1)$--; and col. 2, line 25: Amend "90/10≧55/45," to --90/10≧ST/AN≧55/45--.

Claim 3, col. 2, line 43: Amend "1-3" to --1-30--.

Signed and Sealed this

Twenty-third Day of June, 1992

Attest:

DOUGLAS B. COMER

Attesting Officer      Acting Commissioner of Patents and Trademarks